(12) United States Patent
Piggott et al.

(10) Patent No.: US 8,219,357 B2
(45) Date of Patent: Jul. 10, 2012

(54) DYNAMIC DISPLAY SYSTEMS AND METHODS THEREOF

(75) Inventors: Christopher Piggott, Pittsford, NY (US); Edward McCarthy, Pittsford, NY (US); Michael G. Thurston, Penfield, NY (US); Sean McConky, Lockport, NY (US)

(73) Assignee: Rochester Institute of Technology, Rochester, NY (US)

( * ) Notice: Subject to any disclaimer, the term of this patent is extended or adjusted under 35 U.S.C. 154(b) by 630 days.

(21) Appl. No.: 12/053,079

(22) Filed: Mar. 21, 2008

(65) Prior Publication Data

US 2009/0240469 A1 Sep. 24, 2009

(51) Int. Cl.
*G06F 11/30* (2006.01)
(52) U.S. Cl. ............... 702/183; 702/185; 340/425.5; 340/461
(58) Field of Classification Search .......... 702/183, 702/184; 340/425.5, 428, 426.22, 426.23, 340/438, 439, 441, 442, 461, 462; 700/108
See application file for complete search history.

(56) References Cited

U.S. PATENT DOCUMENTS

| | | | | |
|---|---|---|---|---|
| 4,970,492 A | * | 11/1990 | King | 340/450.3 |
| 5,371,487 A | * | 12/1994 | Hoffman et al. | 340/425.5 |
| 6,256,594 B1 | * | 7/2001 | Yamamoto et al. | 702/185 |
| 2007/0078598 A1 | * | 4/2007 | Watanabe et al. | 701/211 |
| 2009/0121857 A1 | * | 5/2009 | Stegman et al. | 340/442 |

* cited by examiner

*Primary Examiner* — Manuel L Barbee
(74) *Attorney, Agent, or Firm* — LeClairRyan a Professional Corporation

(57) ABSTRACT

A method and system for displaying asset health information includes determining a status of at least one asset in a monitored system based on operational information obtained about the at least one asset. The obtained operational information about the at least one asset is compared against other operational information obtained about the monitored system. A review of the determined status of the at least one asset is conducted based on the comparison. At least one of textual information and numeric information is displayed based on the conducted review of the determined status of the at least one asset. Additionally, at least one of three or more indicator lights is displayed based on the conducted review of the determined status of the at least one asset.

40 Claims, 2 Drawing Sheets

DYNAMIC DISPLAY SYSTEMS AND METHODS THEREOF

The U.S. Government has a paid-up license in this invention and the right in limited circumstances to require the patent owner to license others on reasonable terms as provided for by the terms of Contract No. N00014-03-1-0860 awarded by the Office of Naval Research.

FIELD OF THE INVENTION

The present invention relates to display systems and methods, and more particularly, to dynamic display systems and methods thereof.

BACKGROUND

Basically, display systems are intended to provide a user a visual display of information. Unfortunately, with the rapid increase in available information, these display systems often do not convey the necessary information to the user of the display in a quick, straightforward and effective manner. The users must often manually sort through large volumes of material to obtain the necessary information. This can be very distracting to the operator. Additionally, prior display systems have failed to provide any sort of indication accompanying the information which identifies the priority of the information. Further, these prior display systems have not allowed the user to customize the threshold at which information is provided to the operator.

SUMMARY OF THE INVENTION

A method for displaying asset health information in accordance with embodiments of the present invention includes determining a status of at least one asset in a monitored system based on operational information obtained about the at least one asset. The obtained operational information about the at least one asset is compared against other operational information obtained about the monitored system. A review of the determined status of the at least one asset is conducted based on the comparison. At least one of textual information and numeric information is displayed based on the conducted review of the determined status of the at least one asset. At least one of three or more indicator lights is displayed based on the conducted review of the determined status of the at least one asset.

A system in accordance with other embodiments of the present invention includes an asset management system, a supervisory system, and a display system. The asset management system determines a status of at least one asset in a monitored system based on operational information obtained about the at least one asset. The supervisory system compares the obtained operational information about the at least one asset against other operational information obtained about the monitored system and conducts a review of the determined status of the at least one asset based on the comparison. The display system comprises a character display device that displays at least one of textual information and numeric information and an indicator display device that displays one of three or more indicator lights based on the based on the conducted review of the determined status of the at least one asset.

The present invention provides a quick, straightforward, effective, customizable, and reliable system and method for conveying an operational status and associated operational information about one or more assets in a monitored system. With the present invention, an operator of a monitored system is quickly provided the operational status and associated operational information from one or more assets of the monitored system without unduly distracting the operator from other tasks associated with use of the monitored system. Additionally, the present invention helps to ensure the operational status and associated operational information is accurate through the incorporation of a supervisory system. Further, the present invention is customizable allowing the operator to adjust the level at which operational status and associated operational information is displayed to further minimize unnecessary distractions. This type of customization can be essential for the safety and well being of the operator of the monitored system. The present invention also is operator friendly allowing an operator to switch between multiple assets which are being monitored.

DETAILED DESCRIPTION

Figure 1:
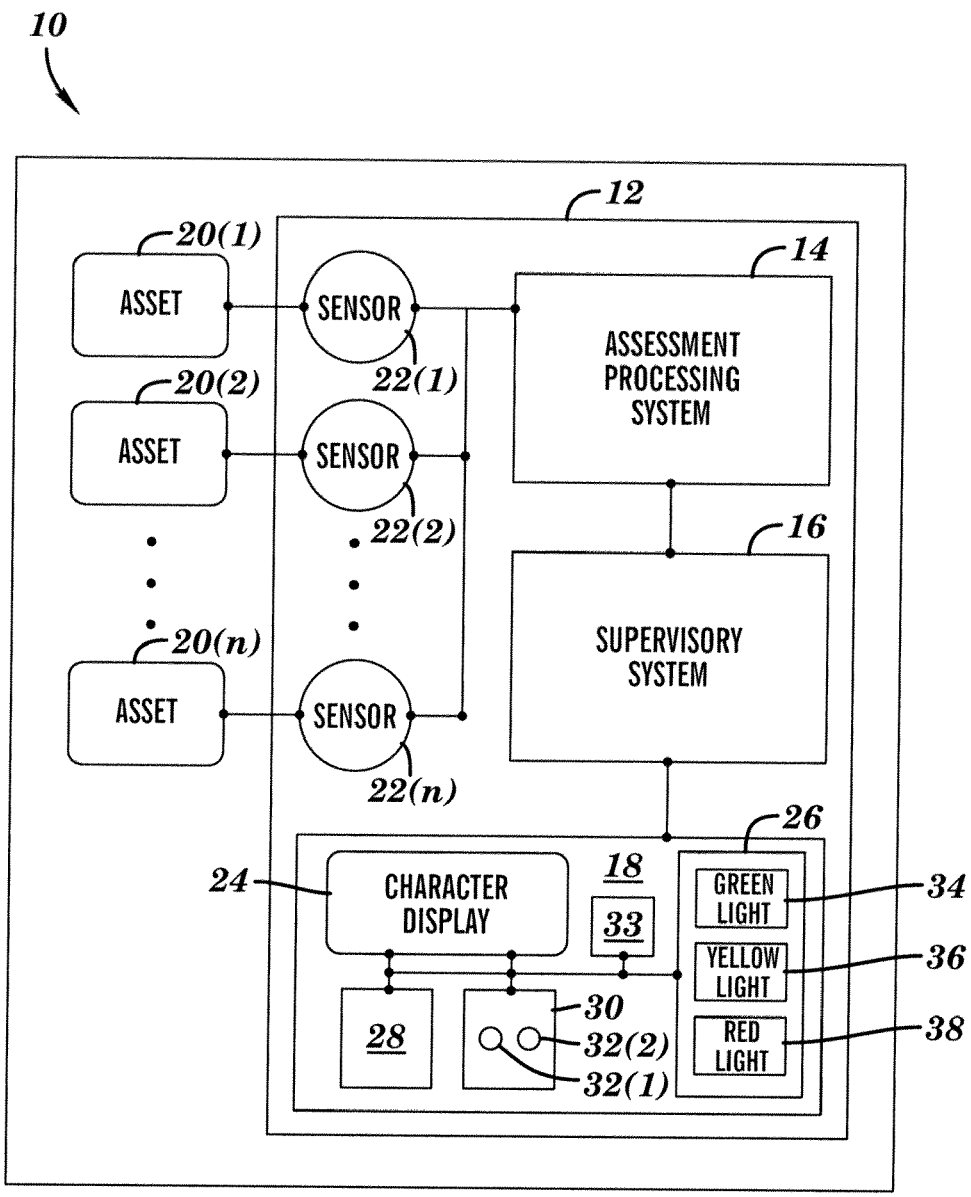
FIG. 1 is a block diagram of a monitored system which has an asset health management system with an assessment processing system 14, a supervisory system, and an asset health display system in accordance with embodiments of the present invention.
Figure 2:
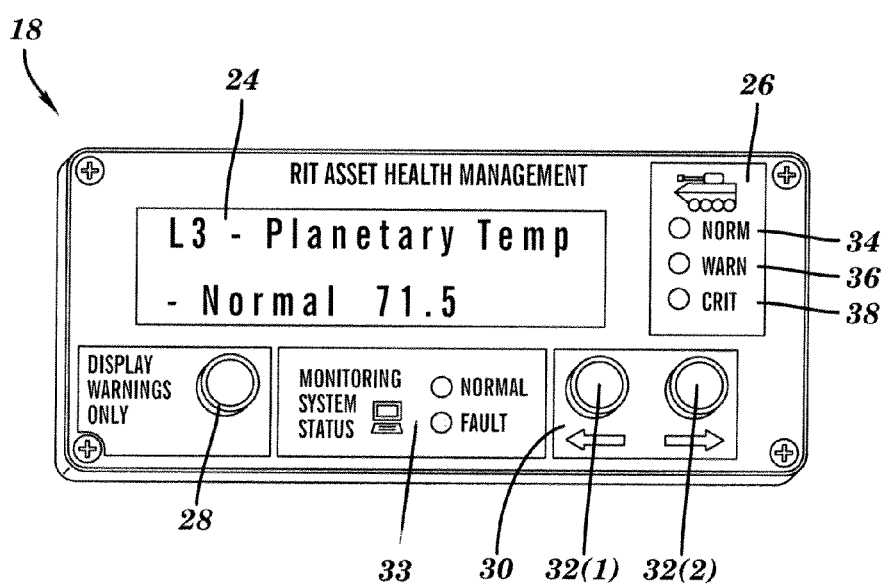
FIG. 2 is a front view of the asset health display system illustrated in FIG. 1.

A monitored system 10 with an asset management system 12 which has an assessment processing system 14, a supervisory system 16, and an asset health display system 18 in accordance with embodiments of the present invention is illustrated in FIGS. 1-2. The present invention provides a number of advantages including a quick, straightforward, effective, customizable, and reliable system and method for conveying an operational status and associated operational information about one or more assets in a monitored system.

Referring to FIG. 1, in this particular embodiment the monitored system 10 is a vehicle, although other types and numbers of systems, devices, and components could be monitored. The monitored system 10 includes a plurality of assets 20(1)-20(n), such as a brake system, a fuel system, and a battery system, although other types and numbers of assets could be used. Additionally, in this particular embodiment, the asset management system 12 is illustrated in the monitored system 10, although some or all of the asset management system 12 could be at other locations. By way of example only, the sensors 22(1)-22(n) could be in the monitored system 10 and in wireless communication with the assessment processing system 14, supervisory system 16, and display system 18 at a remote location.

A plurality of sensors 22(1)-22(n), such as a temperature sensor by way of example only, are each positioned adjacent one or more of the assets 20(1)-20(n) in the monitored system 10, although other types and numbers of data acquisition systems, devices, and components could be used. The plurality of sensors 22(1)-22(n) acquire operational information on each of the assets 20(1)-20(n) in the monitored system 10 which is transmitted to the assessment processing system 14, although other types and amounts of data can be obtained in other manners and provided to the assessment processing system 14.

The assessment processing system 14 provides a diagnostic assessment of the assets 20(1)-20(n) in the monitored system 10, although the assessment processing system 14 provide other types and numbers of assessments and functions. By way of example only, an health assessment processing system that conducts assessments is disclosed in U.S. patent application Ser. No. 11/437,966, filed May 19, 2006, for, "Methods For Asset Health Management And Systems Thereof," claiming priority of U.S. Provisional Patent Application No. 60/682,627, filed May 19, 2005, which is herein incorporated by reference in its entirety.

The assessment processing system 14 includes a central processing unit (CPU) or processor, a memory, and an interface system, and which are coupled together by a data or information bus or other link, although the assessment processing system 14 can include other numbers and types of components, parts, devices, systems, and elements in other configurations. The processor in the assessment processing system 14 executes a program of stored instructions for one or more aspects of the present invention as described and illustrated herein, including methods for displaying asset health information, although the processor could execute other numbers and types of programmed instructions.

The memory in the assessment processing system 14 stores these programmed instructions for one or more aspects of the present invention as described and illustrated herein, including methods for displaying asset health information, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the assessment processing system 14.

The interface system in the assessment processing system 14 is used to operatively couple and communicate between the assessment processing system 14 and the sensors 22(1)-22(n), supervisory system 16, and display system 18 via a communications network, although other types and numbers of communication networks or systems with other types and numbers of connections and configurations can be used.

The supervisory system 16 provides a review of the health assessment of the assets in the monitored system 10, although the supervisory system 16 can have other types and numbers of functions. The supervisory system 16 includes a central processing unit (CPU) or processor, a memory, and an interface system, and which are coupled together by a bus or other link, although the supervisory system 16 can include other numbers and types of components, parts, devices, systems, and elements in other configurations. The processor in the supervisory system 16 executes a program of stored instructions for one or more aspects of the present invention as described and illustrated herein, including methods for displaying asset health information, although the processor could execute other numbers and types of programmed instructions.

The memory in the supervisory system 16 stores these programmed instructions for one or more aspects of the present invention as described and illustrated herein, including methods for displaying asset health information, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the supervisory system 16.

The interface system in the supervisory system 16 is used to operatively couple and communicate between the supervisory system 16 and the sensors 22(1)-22(n), the assessment processing system 14, and the display system 18 via a communications network, although other types and numbers of communication networks or systems with other types and numbers of connections and configurations can be used.

Although embodiments of the assessment processing system 14 and the supervisory system 16 are described and illustrated herein, the assessment processing system 14 and the supervisory system 16 can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, the assessment processing system 14 and the supervisory system 16 may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for the assessment processing system 14 and the supervisory system 16 in any embodiment. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied in whole or in part as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The display system 18 includes a character display 24, an indicator display 26, a level switch 28, a toggling device 30 with toggle switches 32(1)-32(2), and an overall system health display 33, although the display system can have other types and numbers of systems, devices, and components and other numbers and types of display systems which can be configured in different manners can be used. The display system 18 in this particular embodiment or multiple display systems 18 in other embodiments each can be configured to display some or all of the different statuses and operational messages. The display system 18 can be configured or reconfigured in this manner by a message from the supervisory system 18 or from one or more other external system or device. While functioning, the display system 18 determines which statutes and/or operational messages it is configured to display and only displays those statuses and/or operational messages.

In this particular embodiment, the character display 24 comprises a twenty character by two line dot matrix LED display, although other types and numbers of displays with other sizes can be used. The character display 24 displays operational messages for informational purposes and also to indicate a system problem, although other types and numbers of messages can be displayed. The operational messages are prepared and stored in memory in assessment processing system 14 and are encoded to include an indication of how serious the associated particular fault or problem detected by one of the sensors 22(1)-22(n) is.

The indicator display 26 comprises a green light 34 associated with a normal status, a yellow light 36 associated with a warning status, and a red light 38 associated with a critical status, although other types and numbers of indication systems, devices, and components which are associated with other types of operational information can be used. By way of example, the indicator display 26 could comprise a single multicolored LED that could be used to provide the different colors indication the determined status of each of the assets 20(1)-20(n). The indicator display 26 displays a roll up of all the message statuses, although the indicator display could be configured in other manners, such as having the activation of the green light 34, yellow light 36, or red light 38 correspond to the operational message being displayed on character display 24. In this particular embodiment, the roll up means: if there is at least one red message the status is red and the red light 38 is on; if there are no red, but at least one yellow the status is yellow and the yellow light 36 is on; and if there are no yellow or red the status is green and the green light 34 is on, although other types of roll ups or other manners for displaying the information can be used. The roll up enables the user to see at a glance the overall state of the vehicle 10.

The level switch 28 can be activated to allow the user to customize when operational messages are displayed. By way of example only, the level switch 28 could be activated to block operational messages normally displayed on the character display 24 associated with the green light 34 or block operational messages associated with the green light 34 or the yellow light 36. This enables the user to customize the display system 18 to only provide information important to that particular user.

The toggle switches 32(1)-32(2) in the toggling device 30 can be used to switch in either direction between which of the assets 32(1)-32(2) or associated sensors 22(1)-22(n) have operational status and information on display, although other types and numbers of systems for moving between the operational status and information of the different assets 20(1)-20(n) can be used.

The overall system health display 33 is a light which can switch between a green light and a red light, although other types and numbers of displays with other types and numbers of colored lights or indicators could be used. The overall system health display 33 provides a green light indication when assessment processing system 14 and supervisory system 16 are both functioning within normal operating parameters and provides a red light when they are operating outside those parameters, although other types and numbers of triggers could be used.

An example of the method for displaying asset health information in accordance with embodiments of the present invention will now be described with reference to FIGS. 1-2. When the asset health management system 12 is engaged, the sensors 22(1)-22(n) monitor and acquire data on the assets 20(1)-20(n) in the monitored system 10, although other types and numbers of data acquisition systems, devices, and components could be used to monitor and acquire data from other numbers of assets. For example, two or more of the sensors 22(1)-22(n) could be used to monitor and acquire data on one of the assets 20(1)-20(n) so more than one sensor can be the on one asset and also the total number of sensors does not necessarily equal the number of assets. The data acquired by the sensors 22(1)-22(n) is transmitted to the assessment processing system 14, although the assessment processing system 14 could acquire the data in other manners.

When the asset health management system 12 is engaged, the system 12 also monitors one or more operating parameters for the assessment processing system 14 and the supervisory system 16 to determine if the monitored one or more operating parameters are within acceptable tolerances of stored values for the operating parameters, although other numbers and types of systems could be monitored in other manners. If the asset health management system 12 determines the assessment processing system 14 and the supervisory system 16 are operating normally, then the overall system health display 33 provides a green light indication. If the asset health management system 12 determines the assessment processing system 14 and supervisory system 16 are both functioning outside normal operating parameters, then the overall system health display provides a red light indication.

The asset health management system 12 optionally can be configured to monitor, acquire data on, and display operational status and information on other subsets of the assets 20(1)-20(n) which are being monitored. Accordingly, this enables an operator to customize the system 12 to the particular assets the user is concerned about. For example, if the monitored system 10 is a military vehicle and the user is a driver, the driver may only be concerned about assets related to automotive systems. However, in the same vehicle if the user is a commander, the commander may be concerned about automotive related assets and also about weapons related assets. Accordingly, the asset health management system 12 can be programmed to the particular needs of the user, thus eliminating any unnecessary monitoring and displaying of operational status and information.

Next, the assessment processing system 14 conducts an assessment of each of the assets 20(1)-20(n) based on the acquired data and background operational data stored for each of the assets 20(1)-20(n), although other types and numbers of assessments can be performed in other manners. Again by way of example only, an health assessment processing systems conducting this type of assessment is disclosed in U.S. patent application Ser. No. 11/437,966, filed May 19, 2006, for, "Methods For Asset Health Management And Systems Thereof," claiming priority of U.S. Provisional Patent Application No. 60/682,627, filed May 19, 2005, which is herein incorporated by reference in its entirety.

Based on the conducted assessment, the assessment processing system 14 determines an operational status and information to provide to the display system 18 for display, although the assessment processing system 14 can provide other types of information. In this particular embodiment, the operational status comprises a normal status associated with the green light 34, a warning status associated with the yellow light 36, and a critical status associated with a red light 38, although other types and numbers of operational statuses can be used. Additionally, in this particular embodiment the operational information comprises information associated with the operational status to provide an operator with data on the status of the assets 20(1)-20(n) and on severity of any problem, such as the current temperature of the asset, although other types and amounts of information can be displayed.

For each of the assets 20(1)-20(n), textual information associated with each of the warning levels is stored in memory in the assessment processing system 14 while a current value can be inserted dynamically, although other types of information can be stored and obtained from other locations and in other manners. In this example, if the temperature of asset 20(1) is being monitored, then three messages may be stored, such as: "LAV Right Planetary Temperature _____degF" (the current temperature which is within the acceptable range for asset 20(1) is inserted in the blank); "LAV Right Planetary Temperature _____ degF" (the current temperature which is within the warning range for the asset 20(1) is inserted in the blank); and "LAV Right Planetary Temperature _____degF" (the current temperature which is at or above the critical temperature for the asset 20(1) is inserted in the blank), although other numbers and types of operational information could be previously stored for display. With the previously stored operational information, the user is presented the necessary information in a format that quickly provides the necessary message with the dynamically changed value. Additionally, the user is presented this information in a format the user is familiar with.

The assessment processing system 14 optionally can adjust the size of the operational information being provided to fit within the size of the character display 24 in one screenshot, although the operational information can be streamed in or otherwise displayed in more than one screen. Fitting all of the operational information within one screenshot helps to provide the operator of the monitored system 10 with all of the necessary information quickly and effectively. The size of the character display 24 can be entered and stored in memory of the assessment processing system 14 for use in customizing the number of characters used in a message providing operational information, although other manners for determining the size of the character display 24 can be used, such as interrogating the display system 18 with the assessment processing system 14 for this information. In this particular embodiment, the character display 24 has two lines of twenty characters each, although the character display can have other sizes.

The supervisory system 16 is optional and reviews the determination of the operational status and information that is going to be provided to the display system 18 for display. The supervisory system 16 conducts this review by comparing the determined operational status and information for one of the assets 20(1)-20(n) with other operational data for the monitored system 10, such as data acquired from one or more other assets 20(1)-20(n) with similar functions, although other types and numbers of reviews can be conducted. This additional review by the supervisory system 16 helps to ensure the operational status and information provided to the display system 18 for the assets 20(1)-20(n) is accurate.

The display system 18 receives the operational status and information for the assets 20(1)-20(n) and sensors 22(1)-22(n) from the assessment processing system 14, although the display system 18 could receive the information from other types and numbers of systems, devices, and components. A plurality of different operational status and information is stored for each of the assets 20(1)-20(n) and the sensors 22(1)-22(n) and can be retrieved for display. The display system 18 retrieves an obtained configuration on what portion of the plurality of operational status and information for the assets 20(1)-20(n) and the sensors 22(1)-22(n) this display system 18 is configured to display. In this particular embodiment, the configuration is obtained from the supervisory system 16, although the configuration can be obtained in other manners, such as from another external system or device.

Next, the display system 18 determines and restricts what is displayed on the character display 24 and indicator display 26 based on the obtained configuration. More specifically, the character display 24 displays the operational information on one of the assets 20(1)-20(n) and the indicator display 26 engages one of the indicator lights 34, 36, or 38 to turn on which is permitted based on the obtained configuration, although other types and numbers of displays can be used. The green, yellow, red colors for the indicator lights 34, 36, and 38 quickly convey to an operator of the monitored system 10 the operational status of the one of the assets 20(1)-20(n) on display. Additionally, the condensed operational information on the character display 24 quickly and effectively conveys the necessary information on the operation of the one of the assets 20(1)-20(n) on display without unduly distracting the operator of the monitored system 10. In an alternative embodiment, with multiple display systems 18, each of the display systems 18 could have a different configuration on what operational status and information for the assets 20(1)-20(n) and the sensors 22(1)-22(n) is permitted for display and what, if any, is restricted.

The level switch 28 optionally can be activated to disengage one or more levels of operational from being displayed. Again by way of example only, the level switch 28 could be activated to disengage a normal status from being displayed with the green light 34 and from any operational information from being displayed on the character display 24, although other levels could be disengaged, such as the critical level.

Additionally, the toggle switches 32(1)-32(2) in the toggling device 30 can be used to switch in either direction between which of the assets 20(1)-20(n) has operational status and information on display on the display system 18, although other types and numbers of systems for moving between the operational information and status of the different assets 20(1)-20(n) can be used Accordingly, as described and illustrated herein the present invention provides a quick, straightforward, effective, customizable, and reliable system and method for conveying an operational status and associated operational information about one or more assets in a monitored system. With the present invention, a supervisory system helps to ensure the operational status and associated operational information being displayed is accurate. Additionally, the present invention enables the level at which operational status and associated operational information is displayed to be customized.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for displaying asset health information, the method comprising:

determining with one or more display management processing devices a status of at least one of a plurality of assets in a monitored system based on operational information obtained about the at least one asset;

comparing with the one or more display management processing devices the obtained operational information about the at least one asset against other current operational information obtained about at least one other of the plurality of assets in the monitored system;

conducting with the one or more display management processing devices a review of the determined status of the at least one of the plurality of assets based on the comparison; and displaying with a display device at least textual information and at least one of three or more indicator lights associated with the displayed textual information based on the conducted review of the determined status of the at least one of the plurality of assets, each of the three or more indicator lights are associated with each of the plurality of assets.

2. The method as set forth in claim 1 wherein the displaying with the display device at least textual information further comprises obtaining with the one or more display management processing devices stored information for the displaying, wherein at least one field in the stored information is dynamically filled based on the obtained operational information.

3. The method as set forth in claim 1 wherein the displaying with the display device at least textual information further comprises:

determining with the one or more display management processing devices a number of characters available in a display which displays the at least textual information; and generating with the one or more display management processing devices the at least textual information based on the determined status to fit with the determined number of characters available in the display;

wherein the displaying with the display device displays the generated at least textual information on the display.

4. The method as set forth in claim 1 wherein each of the three or more indicator lights comprise a different color light associated with a different operational status and which are each provided by a different lighting device.

5. The method as set forth in claim 1 further comprising selecting with the one or more display management processing devices at least one determined status of the at least one of the plurality of assets to avoid at least the displaying with the display device the at least textual information and the one of the three or more indicator lights.

6. The method as set forth in claim 5 wherein the at least one selected status is a substantially normal status for the at least one of the plurality of assets.

7. The method as set forth in claim 1 further comprising:

obtaining with the one or more display management processing devices a configuration for at least one display system about the at least textual information and about the at least one of three or more indicator lights which can be displayed; and determining with the one or more display management processing devices which of the at least textual information and the at least one of three or more indicator lights can be displayed on the at least one display system based on the obtained configuration, wherein the displaying the at least textual information and the displaying one of three or more indicator lights is displayed on the at least one display system based on the determining which of the at least textual information and the at least one of three or more indicator lights can be displayed.

8. The method as set forth in claim 1 further comprising storing with the one or more display management processing devices a plurality of at least textual information for each of the determined statuses for the at least one of the plurality of assets.

9. The method as set forth in claim 1 further comprising:

determining with the one or more display management processing devices a status of at least one monitoring system; and displaying with the display device the determined status of the monitoring system.

10. The method as set forth in claim 1 further comprising:

monitoring with an overall management processing device one or more operating parameters of the one or more display management processing devices;

determining with the overall management processing device whether the monitored one or more operating parameters of the one or more display management processing devices are within a tolerance for each of the one or more operating parameters; and displaying with an overall health system display a first indication when the monitored one or more operating parameters of the one or more display management processing devices are within the tolerance for each of the one or more operating parameters and a second indication when the monitored one or more operating parameters of the one or more display management processing devices are outside the tolerance for at least one of the one or more operating parameters.

11. The method as set forth in claim 1 further comprising adjusting with the one or more display management processing devices between two or more levels at which the display device displays the at least textual information and the at least one of three or more indicator lights.

12. A system comprising:

an asset management system that determines a status of at least one of the plurality of assets in a monitored system based on operational information obtained about the at least one of the plurality of assets;

a supervisory system that compares the obtained operational information about the at least one of the plurality of assets against other current operational information obtained about at least one other of the plurality of assets in the monitored system and conducts a review of the determined status of the at least one of the plurality of assets based on the comparison; and a display system comprising a character display device that displays at least textual information and an indicator display device that displays one of three or more indicator lights associated with the displayed textual information based on the based on the conducted review of the determined status of the at least one of the plurality of assets, each of the three or more indicator lights are associated with each of the plurality of assets.

13. The system as set forth in claim 12 wherein the display system obtains stored information for the display and at least a portion of the obtained operational information which is dynamically filled into at least one field in the obtained stored information and displayed by the display system.

14. The system as set forth in claim 12 wherein:

the asset management system determines a number of characters available in the character display device and generates the at least textual information based on the determined status to fit within the determined number of characters available in the character display device;

the display system displays the generated at least textual information on the character display device.

15. The system as set forth in claim 12 wherein each of the three or more indicator lights comprise a different color light associated with a different operational status and which are each provided by a different lighting device.

16. The system as set forth in claim 12 further comprising a first selecting device used to select at least one determined status for the at least one of the plurality of assets to at least avoid displaying any indicator light from the indicator display device.

17. The method as set forth in claim 15 wherein the at least one selected status is a substantially normal status for the at least one of the plurality of assets.

18. The system as set forth in claim 12 wherein the asset management system obtains a configuration for the display system about the at least textual information and about the at least one of three or more indicator lights which can be displayed, wherein the display system determines which of the at least textual information and the at least one of three or more indicator lights can be displayed on the at least one display system based on the obtained configuration and displays based on the determination.

19. The system as set forth in claim 12 wherein the asset management system stores a plurality of at least textual information for each of the determined statuses for the at least one of the plurality of assets.

20. The system as set forth in claim 12 wherein the asset management system determines a status of at least one monitoring system and the display system displays the determined status of the at least one monitoring system.

21. The system as set forth in claim 12 further comprising:
monitoring with an overall management system one or more operating parameters of at least one of the asset management system and the supervisory system;
determining with the overall management system whether the monitored one or more operating parameters of the at least one of the asset management system and the supervisory system are within a tolerance for each of the one or more operating parameters; and
displaying with an overall health system display system a first indication when the monitored one or more operating parameters of the at least one of the asset management system and the supervisory system are within the tolerance for each of the one or more operating parameters and a second indication when the monitored one or more operating parameters of the at least one of the asset management system and the supervisory system are outside the tolerance for at least one of the one or more operating parameters.

22. The system as set forth in claim 12 wherein the supervisory system is configured to adjust between two or more levels at which the display system displays the at least textual information and the at least one of three or more indicator lights.

23. A non-transitory computer readable medium having stored thereon instructions for displaying asset health information comprising machine executable code which when executed by at least one processor, causes the processor to perform steps comprising:
determining a status of at least one of a plurality of assets in a monitored system based on operational information obtained about the at least one asset;
comparing the obtained operational information about the at least one asset against other current operational information obtained about at least one other of the plurality of assets in the monitored system;
conducting a review of the determined status of the at least one of the plurality of assets based on the comparing; and
displaying at least textual information and at least one of three or more indicator lights associated with the displayed textual information based on the conducted review of the determined status of the at least one of the plurality of assets, each of the three or more indicator lights are associated with each of the plurality of assets.

24. The medium as set forth in claim 23 wherein the displaying further comprises obtaining stored information for the displaying, wherein at least one field in the stored information is dynamically filled based on the obtained operational information.

25. The medium as set forth in claim 23 wherein the displaying further comprises:
determining a number of characters available in a display which displays the at least textual information; and
generating the at least textual information based on the determined status to fit with the determined number of characters available in the display, wherein the displaying displays the generated at least textual information on the display.

26. The medium as set forth in claim 23 wherein each of the three or more indicator lights comprise a different color light associated with a different operational status and which are each provided by a different lighting device.

27. The medium as set forth in claim 23 further comprising selecting at least one determined status of the at least one of the plurality of assets to avoid at least the displaying with the display device the at least textual information and the one of the three or more indicator lights.

28. The medium as set forth in claim 27 wherein the at least one selected status is a substantially normal status for the at least one of the plurality of assets.

29. The medium as set forth in claim 23 further comprising:
obtaining a configuration for at least one display system about the at least textual information and about the at least one of three or more indicator lights which can be displayed; and
determining which of the at least textual information and the at least one of three or more indicator lights can be displayed based on the obtained configuration, wherein the displaying the at least textual information and the displaying one of three or more indicator lights is displayed based on the determining which of the at least textual information and the at least one of three or more indicator lights can be displayed.

30. The medium as set forth in claim 23 further comprising storing a plurality of at least textual information for each of the determined statuses for the at least one of the plurality of assets.

31. The medium as set forth in claim 23 further comprising:
determining s a status of at least one monitoring system; and
displaying the determined status of the monitoring system.

32. A computing apparatus including a memory coupled to one or more processors which are configured to execute programmed instructions stored in the memory comprising:
determining a status of at least one of a plurality of assets in a monitored system based on operational information obtained about the at least one asset;
comparing the obtained operational information about the at least one asset against other current operational information obtained about at least one other of the plurality of assets in the monitored system;
conducting a review of the determined status of the at least one of the plurality of assets based on the comparing; and displaying at least textual information and at least one of three or more indicator lights associated with the displayed textual information based on the conducted review of the determined status of the at least one of the plurality of assets, each of the three or more indicator lights are associated with each of the plurality of assets.

33. The apparatus as set forth in claim 32 wherein the processor is further configured to execute programmed instructions stored in the memory for the displaying further comprising obtaining stored information for the displaying, wherein at least one field in the stored information is dynamically filled based on the obtained operational information.

34. The apparatus as set forth in claim 32 wherein the processor is further configured to execute programmed instructions stored in the memory for the displaying further comprising:
   determining a number of characters available in a display which displays the at least textual information; and
   generating the at least textual information based on the determined status to fit with the determined number of characters available in the display, wherein the displaying displays the generated at least textual information on the display.

35. The apparatus as set forth in claim 32 wherein each of the three or more indicator lights comprise a different color light associated with a different operational status and which are each provided by a different lighting device.

36. The apparatus as set forth in claim 32 wherein the processor is further configured to execute programmed instructions stored in the memory further comprising selecting at least one determined status of the at least one of the plurality of assets to avoid at least the displaying with the display device the at least textual information and the one of the three or more indicator lights.

37. The apparatus as set forth in claim 36 wherein the at least one selected status is a substantially normal status for the at least one of the plurality of assets.

38. The apparatus as set forth in claim 32 wherein the processor is further configured to execute programmed instructions stored in the memory further comprising:
   obtaining a configuration for at least one display system about the at least textual information and about the at least one of three or more indicator lights which can be displayed; and
   determining which of the at least textual information and the at least one of three or more indicator lights can be displayed based on the obtained configuration, wherein the displaying the at least textual information and the displaying one of three or more indicator lights is displayed based on the determining which of the at least textual information and the at least one of three or more indicator lights can be displayed.

39. The apparatus as set forth in claim 32 wherein the processor is further configured to execute programmed instructions stored in the memory further comprising storing a plurality of at least textual information for each of the determined statuses for the at least one of the plurality of assets.

40. The apparatus as set forth in claim 32 wherein the processor is further configured to execute programmed instructions stored in the memory further comprising:
   determining s a status of at least one monitoring system; and
   displaying the determined status of the monitoring system.

* * * * *